United States Patent [19]

Huber

[11] Patent Number: 4,747,663
[45] Date of Patent: May 31, 1988

[54] MONOMODE QUARTZ GLASS LIGHT WAVEGUIDE AND METHOD FOR PRODUCING IT

[75] Inventor: Hans-Peter Huber, New Ulm, Fed. Rep. of Germany

[73] Assignee: Licentia Patent-Verwaltungs-GmbH, Frankfurt am Main, Fed. Rep. of Germany

[21] Appl. No.: 841,804

[22] Filed: Mar. 20, 1986

[30] Foreign Application Priority Data

Mar. 20, 1985 [DE] Fed. Rep. of Germany ....... 3510023

[51] Int. Cl.$^4$ ................................................. G02B 6/22
[52] U.S. Cl. ............................... 350/96.33; 350/96.30
[58] Field of Search ............... 350/96.29, 96.30, 96.34, 350/96.33

[56] References Cited

U.S. PATENT DOCUMENTS

| | | | |
|---|---|---|---|
| 4,114,980 | 9/1978 | Asam et al. | 350/96.34 X |
| 4,306,767 | 12/1981 | Kawachi et al. | 350/96.34 X |
| 4,327,965 | 5/1982 | Black | 350/96.33 |

FOREIGN PATENT DOCUMENTS 2046239 12/1980 United Kingdom ............. 350/96.33

OTHER PUBLICATIONS

Electronic Letters, Jun. 10, 1976, vol. 12, No. 12, "Spectral Losses of Low-OH$^-$ Content Optical Fibers", by Horiguchi et al.
IEEE Jour. of Quantum Elec., vol. QE-17, No. 6, Jun., 1981, "Single Mode Fibers for Submarine Cable System", by Irven et al.
IEEE. Jour. of Quantum Elec., vol. QE-18, No. 11, Nov. 1982, "Fabrication of OH$^-$ Free Multi Mode Fiber by VPAD", by Chida et al.
Japanese Journal of Applied Physics, vol. 17, No. 11; Nov., 1978, pp. 1975-1981 (article by Kawachi et al; OH$^-$ Ion Distribution in Preforms of High-Silica Optical Fiber).

*Primary Examiner*—Eugene R. LaRoche
*Assistant Examiner*—James C. Lee
*Attorney, Agent, or Firm*—Spencer & Frank

[57] ABSTRACT

The present invention relates to an economically manufactured monomode quartz glass light waveguide and to a method for producing it, particularly for the spectral range around 1.3 μm and around 1.56 μm, with optical transmission losses less than 0.5 dB/km. This is accomplished by a light carrying core region surrounded by inner and outer (quartz glass) jacket regions. The outer diameters of the inner jacket region and of the core region have a ratio which lies in a value range from about 1.8 to about 3.5.

6 Claims, 1 Drawing Sheet

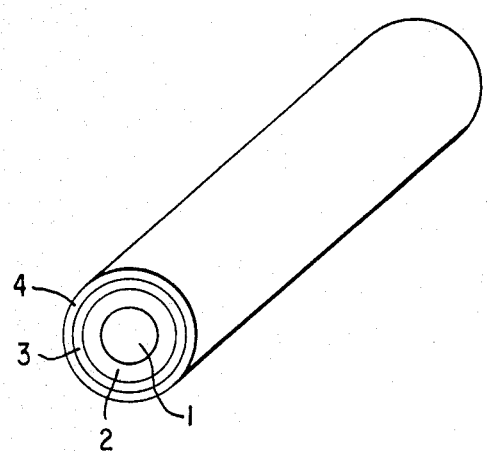

MONOMODE QUARTZ GLASS LIGHT WAVEGUIDE AND METHOD FOR PRODUCING IT

BACKGROUND OF THE INVENTION

1. Field of the Invention

The present invention relates to a monomode light waveguide, an optical fiber, made of quartz glass and to a method for producing it.

2. Description of Related Art

Light waveguides for the transmission of optical signals are composed of a light carrying core region and a cladding region surrounding this core region, with the core region having a slightly higher index of optical refraction than the cladding region. The light to be transmitted is essentially carried in the core region and only a relatively small amount of the light extends into the cladding region immediately surrounding the core region.

A distinction is made in light waveguides for optical communications transmission between multimode and monomode light waveguides. Multimode light waveguides, particularly the so-called gradient index fibers, have a typical core diameter of 50 μm with a typical outer diameter of the cladding region of 125 μm. Monomode light waveguides having the same outer diameter of the cladding region have a typical core diameter of 8 μm to 10 μm. Monomode light waveguides permit the realization of very much higher transmission bandwidths than multimode light waveguides. Therefore, monomode light waveguides are particularly well suited for long-distance transmission paths on which the repeaters are spaced far apart and also for optical broadband networks operating over short-distances (local networks), particularly if such monomode light waveguides can be manufactured more economically than the multimode type.

At present, quartz glass light waveguides are used almost exclusively in the field of optical communications transmission. The total dispersion of monomode fibers disappears in these waveguides at a wavelength around 1.3 μm; at the same time, optical transmission losses under 0.5 dB/km are possible. To realize such low losses, the $OH^-$ ion concentration in the light carrying core region and in the adjacent cladding region must be no more than about 100 ppb, since at light wavelengths of 1.24 μm and 1.39 μm OH vibration bands in the quartz glass produce heavy optical transmission losses. Overlapping of these absorption bands may increase the optical losses over the entire spectral range extending from about 1.2 μm to 1.55 μm. The required low $OH^-$ ion concentration can be realized in quartz glass only with considerable technological expenditures and therefore is not cost effective.

The manufacture of light waveguides made of quartz glass is presently based almost exclusively on chemical gas phase precipitation of quartz glass. Various processes, e.g. the MCVD (modified chemical vapor deposition), the PCVD (plasma chemical vapor deposition), the OVD (outside vapor deposition) and the VAD (vapor axial deposition) process, have been develoed for this purpose. For example, in the MCVD process, highly pure quartz glass is precipitated from the gas phase on the inner walls of a substrate tube of quartz glass.

To produce a light waveguide from a preform, a suitably doped, precipitated quartz glass layers forms the core region and an inner cladding region, while the substrate tube forms the outer cladding region. This manufacturing process is particularly suited for the production of monomide light waveguides (monomode fibers) since in this process the volume of the core region is relatively small compared to the volume of the total fiber. Therefore it is necessary to precipitate relatively little highly pure and thus expensive quartz glass on a substrate tube made essentially of a much less expensive (quartz) material.

Since with monomode light waveguides part of the carried light extends into the cladding region, an inner jacket region likewise of highly pure quartz material must be provided immediately around the core region. If $2a$ is the diameter of the core region, this requires a diameter of about $4a$. If, however, $OH^-$ ion are present in the substrate tube made of the less expensive quartz glass, these may diffuse into the inner cladding region during the production of the preform and during drawing of the fibers and may cause a considerable increase in attenuation. The diffusion of $OH^-$ ions was examined, for example, in a paper published in the periodical entitled "Japanese Journal of Applied Physics", Volume 17, No. 11, November, 1978, at pages 1975-1981. There it is stated that the ratio of the cladding radius to the core radius must be at least about five to one to realize an OH absorption of less than 20 dB/km at a light wavelength of 1.39 μm.

SUMMARY OF THE INVENTION

The invention provides a monomode light waveguide of quartz glass including a light carrying core region, an inner cladding region surrounding the core region, and an outer cladding region surrounding the inner cladding region. The index of refraction of the core region is greater than the indices of refraction of the cladding regions, and the indices of refraction of the cladding regions is about equal. The ratio of the outer diameter of the inner cladding region to the outer diameter of the core region is about 1.8 to about 3.5, preferably about 2.5.

It is therefore an object of the present invention to improve a light waveguide of this type so that it has particularly low optical transmission losses, particularly in the spectral regions about 1.3 μm and about 1.56 μm and can be manufactured economically. It is another object of the invention to provide a method for producing such a light waveguide.

An advantage of the method of the invention is that the interior coating process requires the precipitation of only a thin quartz glass layer which has an extremely low $OH^-$ concentration of less than about 10 parts per billion (ppb). The $OH^-$ ion concentration of the inner cladding region, adjacent to the core region, may be less than about 100 ppb. The predominant portion of the fiber, constituting the outer cladding region, may be composed of less expensive quartz glass. The portion of the outer cladding region adjacent the inner cladding region preferably has a $OH^-$ ion concentration of about 10 ppb or less. This portion of the outer cladding region is preferably greater than about 5 μm.

The invention is based on the realization that, if quartz glass tubes made of less expensive molten natural quartz and having an $OH^-$ ion content of about 2 to about 10 ppm are used with a precipitation rate of more than about 0.5 g/min, the OH diffusion in the precipitated quartz glass layers is so low that it is practically negligible.

BRIEF DESCRIPTION OF THE DRAWING

The FIGURE illustrates a composite monomode light waveguide including a core (1), an inner cladding (2), an intermediate layer (4) and an outer cladding (3).

DESCRIPTION OF THE PREFERRED EMBODIMENTS

The invention will be described in greater detail below with references to examples. These examples are given by way of illustration and not by way of limitation, in order that those skilled in the art may better understand how the present invention may be practiced.

The FIGURE illustrates a composite monomode light waveguide including a core (1), an inner cladding (2), an intermediate and an outer cladding (3).

EXAMPLE 1

To produce a monomode light waveguide having a "matched cladding" refraction index profile and a "cutoff" light wavelength of approximately 1.25 $\mu$m, a quartz glass substrate tube having an outer diameter of approximately 20 mm and a wall thickness of approximately 2 mm is initially chemically cleaned, e.g. by etching. The term "matched cladding" means that the inner cladding (2) has essentially the same refractive index as the surrounding outer cladding (3), e.g. the quartz glass substrate tube. The term "cut off" wavelength means that for greater wavelengths the second order $LP_{11}$ mode ceases to be a bound mode.

Then the substrate tube is heated to approximately 2000° K. and simultaneously its interior is rinsed with chlorine gas. This creates a region deficient in $OH^-$ ions in the substrate tube, adjacent its inner wall. By coating the interior of the substrate tube according to the above-mentioned MCVD process, one or a plurality of undoped and/or compensation doped quartz glass layers are now applied, which have a total thickness of approximately 200 $\mu$m and form the inner cladding region in the finished light waveguide. The selection of doping substances for the inner cladding region, e.g. fluorine, $GeO_2$, $P_2O_5$, is made in a manner such that the optical refraction index of the inner cladding region is essentially equal to that of the substrate tube.

An intermediate layer may be provided between the inner cladding region and the outer cladding region. This intermediate layer surrounds the inner cladding region and prevents the diffusion of $OH^-$ ions from the outer cladding region into the inner cladding region. The intermediate layer is composed of quartz glass doped with $B_2O_3$, or F and $GeO_2$, or $P_2O_5$. The intermediate layer has a thickness from about 2 $\mu$m to 5 $\mu$m, and a $OH^-$ ion concentration of about 10 ppb or less. On these quartz glass layers, which correspond to the inner cladding region, doped quartz glass layers having a thickness of approximately 50 $\mu$m are then applied to correspond to the core region. $GeO_2$ and/or $P_2O_5$, for example, are suitable doping substances for this purpose. Then the interiorly coated substrate tube is collapsed into a preform rod. To mechanically reinforce the outer cladding region, the preform is encased in a further cost-effective quartz glass tube and is drawn into a monomode light waveguide. The monomode light waveguide has a core region which has an outer diameter of approximately 8.5 $\mu$m, an inner cladding region having an outer diameter of approximately 20 $\mu$m and an outer cladding region having an outer diameter of approximately 125 $\mu$m.

EXAMPLE 2

An intermediate layer of quartz glass doped with fluorine, boron oxide and $GeO_2$ is initially applied at a thickness of about 50 $\mu$m to the inner wall of a purified substrate tube according to Example 1 as the $OH^-$ ion diffusion barrier layer. Then—according to Example 1—quartz glass layers for the inner cladding region and the core region are applied onto this intermediate layer. The collapsed preform rod encased in a further cost-effective quartz glass tube is then drawn into a monomode light waveguide.

This application corresponds to application P 35 10 023.0 filed Mar. 20, 1985 in the Patent Office of the Federal Republic of Germany, the entire disclosure of which is incorporated herein by reference.

It is understood that various other modifications will be apparent to and can readily be mode by those skilled in the art without departing from the scope and spirit of the invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

What is claimed is:

1. A monomode light waveguide of quartz glass, comprising a light carrying core means, an inner cladding means surrounding said core means, an intermediate layer surrounding said inner cladding means, and an outer cladding means surrounding said intermediate layer, the index of refraction of the core means being greater than that of both cladding means and the indices of refraction of the inner and outer cladding means being essentially equal, the ratio of the outer diameter of the inner cladding means to the outer diameter of the core means being in a range between about 1.8 and about 3.5, and said intermediate layer preventing diffusion of $OH^-$ ions from the outer cladding means into the inner cladding means.

2. The monomode light waveguide as set forth in claim 1, wherein the ratio of the outer diameter of the inner cladding means to the outer diameter of the core means is about 2.5.

3. The monomode light waveguide as set forth in claim 1, wherein said intermediate layer is composed of quartz glass doped with $B_2O_3$, F and $GeO_2$, or $P_2O_5$ and has a $OH^-$ ion concentration about 10 ppb or less and said intermediate layer has a thickness which lies in a range from about 2 $\mu$m to 5 $\mu$m.

4. The monomode light waveguide as set forth in claim 1, wherein a region of the outer cladding adjacent the inner cladding means has a $OH^-$ ion concentration about 10 ppb or less and said adjacent region has a thickness greater than about 5 $\mu$m.

5. The monomode light waveguide as set forth in claim 1, wherein the core means is doped with a doping material that increases the refraction index, preferably germanium dioxide, phosphorus pentoxide, or mixtures thereof, and the inner cladding means is composed of undoped silicon dioxide substances in such a manner that its index of refraction is essentially equal to the index of refraction of the outer cladding means.

6. The monomode light waveguide as set forth in claim 1, wherein the inner cladding means, at least in its region adjacent the core means, has an $OH^-$ ion concentration that is less than about 100 ppb.

* * * * *